United States Patent
Damle et al.

(10) Patent No.: US 7,586,950 B1
(45) Date of Patent: Sep. 8, 2009

(54) REMOTE MANAGEMENT INTERFACE

(75) Inventors: Rajendra R. Damle, Plano, TX (US); Robert W. Cantwell, Lucas, TX (US); Jack R. Carrell, Rockwall, TX (US); Steven C. Deans, Plano, TX (US); Trevis M. Lunsford, McKinney, TX (US); Rakesh G. Raja, Richardson, TX (US); Troy D. Robinson, Allen, TX (US)

(73) Assignee: Ceterus Networks, Inc., Richardson, TX (US)

( * ) Notice: Subject to any disclaimer, the term of this patent is extended or adjusted under 35 U.S.C. 154(b) by 949 days.

(21) Appl. No.: 10/403,841

(22) Filed: Mar. 31, 2003

Related U.S. Application Data

(60) Provisional application No. 60/410,425, filed on Sep. 13, 2002.

(51) Int. Cl.
*G06F 15/173* (2006.01)
(52) U.S. Cl. .......................... 370/474; 370/236; 709/223
(58) Field of Classification Search ................. 370/474, 370/236, 236.1, 236.2, 241.1, 522, 528, 529; 709/223
See application file for complete search history.

(56) References Cited

U.S. PATENT DOCUMENTS

| | | | |
|---|---|---|---|
| 4,383,316 A | 5/1983 | Seidel ......................... 370/118 |
| 4,577,312 A | 3/1986 | Nash ............................. 370/84 |
| 4,703,475 A | 10/1987 | Dretzka et al. ................. 370/60 |
| 4,775,987 A | 10/1988 | Miller .......................... 375/38 |
| 4,885,738 A | 12/1989 | Bowers et al. ............. 370/58.1 |
| 4,991,172 A | 2/1991 | Cidon et al. ................ 370/94.1 |
| 5,065,396 A | 11/1991 | Castellano et al. ............ 370/84 |
| 5,251,210 A | 10/1993 | Mann et al. .................... 370/84 |
| 5,293,378 A | 3/1994 | Shimizu ..................... 370/94.1 |
| 5,570,356 A | 10/1996 | Finney et al. ............... 370/85.9 |
| 6,671,284 B1* | 12/2003 | Yonge et al. ................. 370/462 |
| 6,741,566 B1* | 5/2004 | Furlong et al. .............. 370/236 |
| 7,020,165 B2* | 3/2006 | Rakib et al. .................. 370/485 |
| 7,028,241 B1* | 4/2006 | Blair et al. ................... 714/752 |
| 7,085,247 B2* | 8/2006 | Schweinhart et al. ........ 370/316 |
| 7,110,359 B1* | 9/2006 | Acharya ...................... 370/235 |
| 2001/0002863 A1* | 6/2001 | Yoshiyama .................. 359/124 |
| 2002/0035641 A1* | 3/2002 | Kurose et al. ............... 709/241 |
| 2002/0054574 A1* | 5/2002 | Beach et al. ................. 370/279 |
| 2002/0101826 A1* | 8/2002 | Giacopelli et al. ........... 370/252 |
| 2002/0104030 A1* | 8/2002 | Ahn ............................ 713/310 |

\* cited by examiner

*Primary Examiner*—Brian D Nguyen
(74) *Attorney, Agent, or Firm*—Campbell Stephenson LLP

(57) ABSTRACT

A system and method for remote management of a network device is disclosed. The system includes a network device controller and a transmit unit coupled to the network device controller. The transmit unit includes a remote management interface queue and a remote management interface. The remote management interface couples the network device controller to the remote management interface queue.

21 Claims, 8 Drawing Sheets

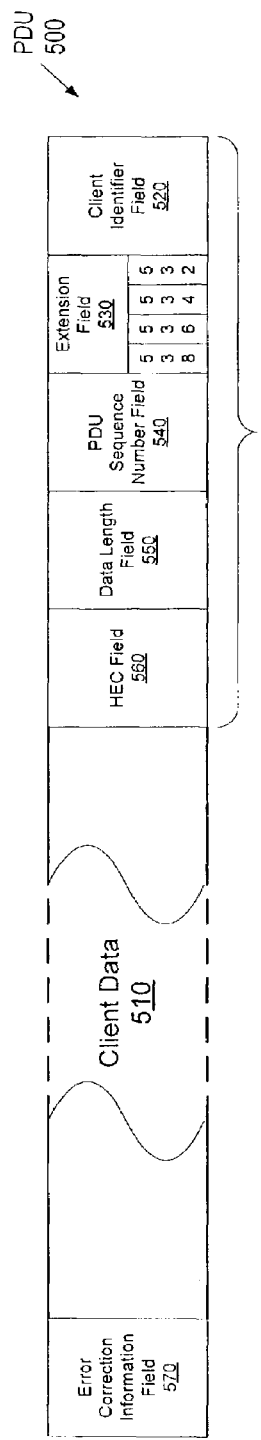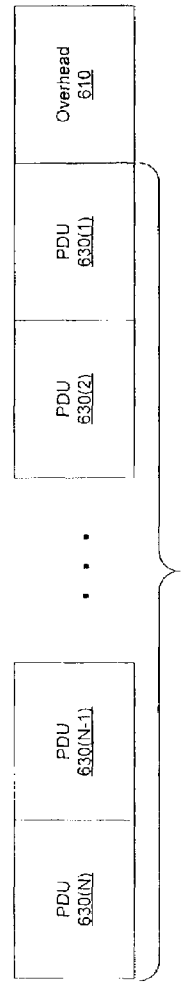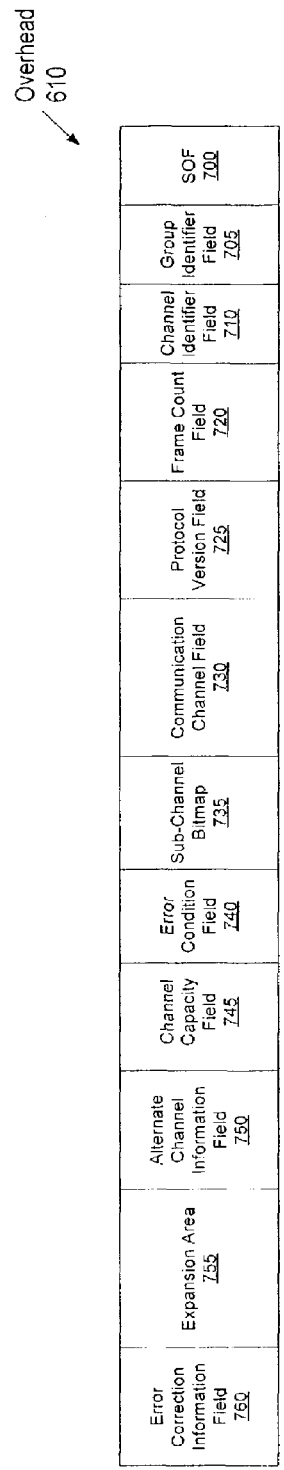

REMOTE MANAGEMENT INTERFACE

This invention claims priority from Provisional Patent Application Ser. No. 60/410,425, entitled "METHOD AND APPARATUS FOR TRANSPORT OF PACKET-BASED DATASTREAMS OVER FRAME-BASED TRANSPORT SYSTEMS", filed Sep. 13, 2002, having R. Butler, W. Szeto, R. Cantwell, R. Damle, D. Nag, J. Carrel, T. Robinson, T. Lunsford, R. Raja, S. Amble and S. Deans as inventors, which is incorporated herein by reference, in its entirety and for all purposes.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to the field of information networks, and more particularly relates to a method and system for remote management of a network device.

2. Description of the Related Art

It is often critical in any network to be able to quickly and efficiently manage the network devices (e.g., routers, switches, add/drop multiplexers, terminal service adaptors, cross-connect systems, etc.) coupled to the network. A failure of a network device can mean the loss of data, the loss of a network connection, and/or the loss of a network itself. Yet, the efficient management of network devices is becoming increasingly difficult.

The network devices themselves are becoming increasingly complex and thus require more complicated management related activities. Additionally, as advances in networking technology evolve, more and more network devices are able to connect to a network at increasing distances from each other. This imposes a significant (if not impossible) burden on the ability of a network administrator to manage the large number of network devices at the physical location of the network device.

To allow for more efficient network device management, protocols have evolved that allow network devices to exchange management related information. However such protocols are not without their problems. In order to provide for the exchange of management data, networking protocols have included a reserved field in the basic unit of the protocol (e.g., a frame). Depending on whether management data is needed, the reserved field is populated with management commands or padded with pad data. However, this technique can be taxing to bandwidth. For example, because the reserved management field is included with every frame that is transmitted on the network, bandwidth is consumed every time a frame, for example, including such a field is transmitted, whether or not the field is populated with actual management commands or padded data. When one considers that thousands of frames may be transmitted each second by hundreds of network devices, the amount of bandwidth consumed by such fields becomes considerably significant.

As an additional problem, networking protocols are constantly evolving. And although one protocol may provide for the management of a network device, the adoption of a new protocol, or the evolution of an existing protocol can make other existing protocols obsolete, and thus the respective management commands ineffective.

Accordingly, a system and method are needed to provide for the remote management of a network device over any frame-based communications environment in a bandwidth efficient manner.

SUMMARY OF THE INVENTION

In one embodiment of the present invention, a system for remote management of a network device is disclosed. The system includes a network device controller and a transmit unit coupled to the network device controller. The transmit unit includes a remote management interface queue and a remote management interface. The remote management interface couples the network device controller to the remote management interface queue.

In another embodiment of the present invention, a method for remote management of a network device is disclosed. The method includes generating a management command for management of a network device coupled to a network, generating a universal transport frame, the universal transport frame comprising said management command, and transmitting said universal transport frame over a frame based network.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 5 a block diagram of a payload data unit (PDU) generated by a transport unit according to one embodiment of the present invention;

FIG. 6 is a block diagram of universal transport (UTP) frame generated by a transport unit according to one embodiment of the present invention;

FIG. 7 is a block diagram illustrating in greater detail the overhead section of a UTP frame according to one embodiment of the present invention;

The use of the same reference symbols in different drawings indicates similar or identical items.

DETAILED DESCRIPTION

Figure 1:
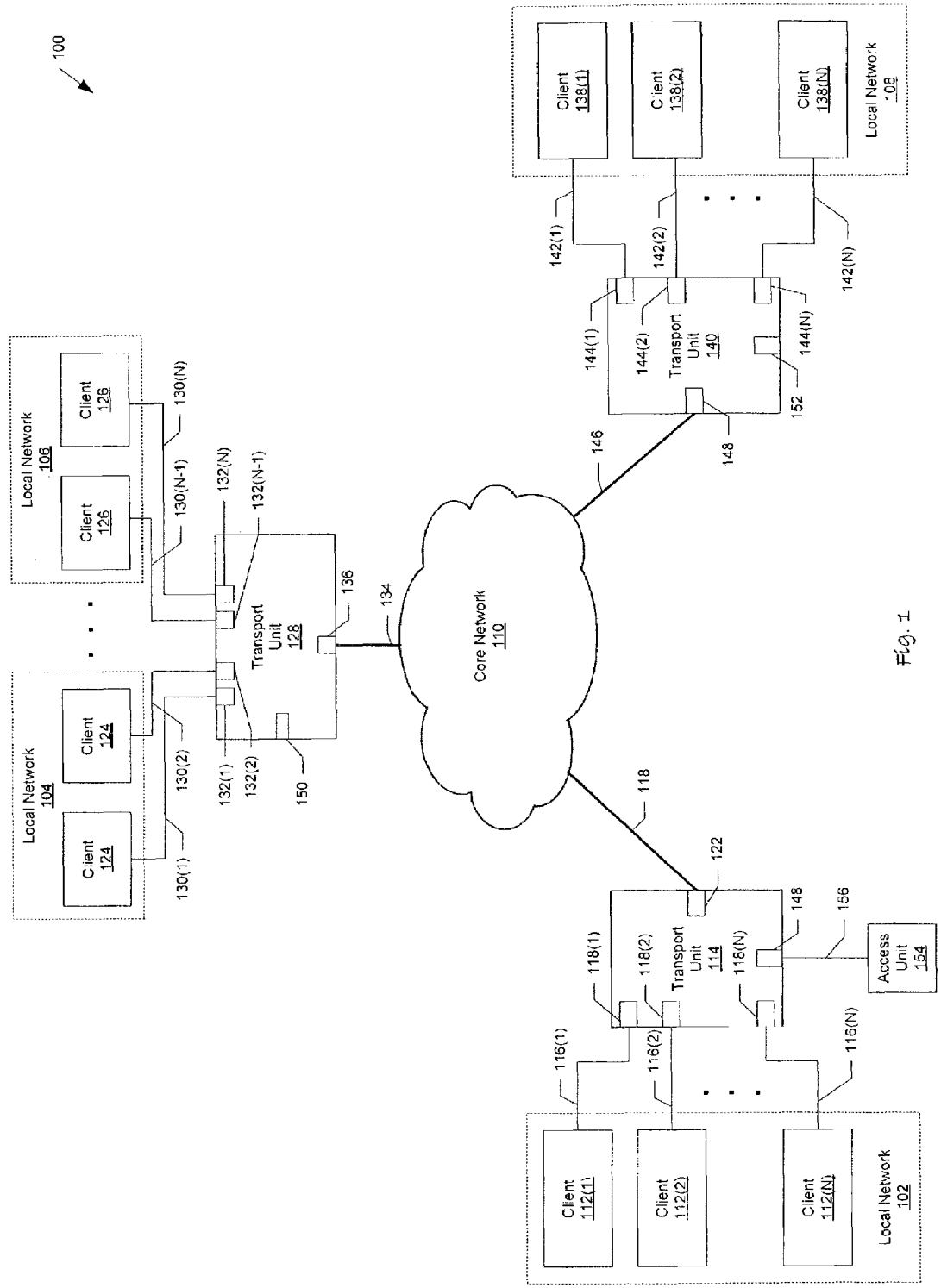
FIG. 1 is a block diagram illustrating the remote management of one or more transport units in accordance with one embodiment of the present invention.

The following text and accompanying Figures provide a detailed description of exemplary embodiments of the invention. However, the scope of the invention should not be limited to the exemplary embodiments described herein, but rather the scope of the invention is to be defined by the claims provided at the end of the description.

Introduction

The present invention provides for remote management of a network device over any frame-based communications environment in a bandwidth efficient manner. In one embodiment of the present invention, a remote network device is coupled to a local network device via a network. To remotely manage the remote network device, remote management commands are first provided to the local network device and then formatted for the network by the local network device. The formatting of the remote management commands enables the commands to be transported via any frame-based communications environment (utilizing existing and future framing protocols and data rates). In addition to formatting the remote management commands, the local network device also provisions bandwidth for the transmission of the remote management commands. For example, in one embodiment of the present invention, remote management commands are provided to the local network device only if the local network device has bandwidth available to transport the remote commands. Once transmitted by the local network device, the remote network device receives the frame formatted remote management commands, extracts the remote management commands, and performs the desired management tasks.

The present invention offers a number of advantages. Because the local and the remote network devices may be a considerable distance from each other (e.g., >1000 km) the present invention enables the remote network device to be managed from a more convenient location.

As another advantage, the present invention provides for a more efficient method of transmitting remote management data as compared with existing systems. In embodiments of the present invention, if remote management is not necessary, remote management data (including padded data for remote management commands) is not transmitted. This allows more bandwidth to be available for other purposes, for example transmitting and receiving client data. This is in contrast to existing systems that provide reserved management fields within frames continuously transmitted over a network. These management fields are populated with management data when there is management data to be transmitted. However, even when there is no management data to be transmitted, the fields consume network bandwidth. When one considers that thousands of frames may be transmitted each second by hundreds of network devices, the amount of bandwidth dedicated to the management channel can be significant.

As yet another advantage, the present invention provides for the provisioning of bandwidth for remote management commands. For example, remote management commands are provided to the local network device only if the local network device has bandwidth available. In one embodiment, the local network device provides this bandwidth status via an internal protocol. Such bandwidth provisioning allows the local network device to decrease or increase the amount of remote management data transmitted based on various factors (e.g., amount and/or priority of client data to be transmitted by the local network device). As still another advantage, due to the unique formatting of the remote management commands, a local network device in accordance with the present invention enables remote management commands to be transported via any frame-based communications environment (utilizing existing and future framing protocols and data rates).

As described herein, the terms "local network device" and "remote network device" are used for adding clarity to the description of the present invention. Unless otherwise indicated, the description of a local network device is applicable to a remote network device, and vice versa. Also, references in the specification to "one embodiment" or "an embodiment" means that a particular feature, structure, or characteristic described in connection with the embodiment is included in at least one embodiment of the invention. The appearances of the phrases "in one embodiment" in various places in the specification are not necessarily all referring to the same embodiment (although they may), nor are separate or alternative embodiments mutually exclusive of other embodiments. Moreover, various features are described that may be exhibited by some embodiments and not by others. Similarly, various requirements are described that may be requirements for some embodiments but not other embodiments.

An Exemplary Network Configuration

FIG. 1 is a block diagram of a network configuration of one type of network device employing the present invention, a transport unit. Generally, a transport unit is a network device that enables multiple packetized data streams to be transmitted across multiple communication links in any number of frame based protocols. Network 100 includes local networks 102, 104, 106, and 108. Local networks 102, 104, 106, and 108 communicate with one another via core network 110. Local network 102 includes clients 112(1)-(N) coupled to a transport unit 114 via communication lines 116(1)-(N) and ports 118(1)-(N). Transport unit 114 is coupled to core network 110 via communication line 120 and port 122.

Communication lines 116(1)-(N) transport packetized data. In one embodiment, port 118(1) can consist of physically diverse optical carrier level 3 (OC3) time division multiplexed (TDM) ports, port 118(2) is a Gigabit Ethernet (GbE) port, and ports 118(3)-118(N) are ports configured to receive and transmit other packetized data. Also in one embodiment, communication line 118 transports framed data via port 122. Although illustrated as one communication line and one port, communication line 118 and port 122 represent any number of (e.g., eight) communication lines and ports, each of which is capable of receiving and transporting framed data according to the same or different framing protocols.

Local networks 104 and 106 include clients 124 and 126 coupled to a transport unit 128 via communication lines 130(1)-(N) and ports 132(1)-(N). Transport unit 128 is coupled to core network 110 via communication line 134 and port 136. Communication lines 130(1)-(N) transport packetized data. In one embodiment, ports 130(1) and 130(2) are optical carrier level 3 (OC3) time division multiplexed (TDM) ports and ports 130(N−1) and 130(N) are Gigabit Ethernet (GbE) ports. Also in one embodiment, communication line 134 transmits and receives framed data via port 136. Although illustrated as one communication line and one port, communication line 134 and port 136 represent any number of (e.g., eight) communication lines and ports, each of which is capable of transporting and receiving framed data according to the same or different framing protocols.

Local network 108 includes clients 138(1)-(N) coupled to a transport unit 140 via communication lines 142(1)-(N) and ports 144(1)-(N). Transport unit 140 is coupled to core network 110 via communication line 146 and port 148. Communication lines 142(1)-(N) transport packetized data. In one embodiment, port 144(1) is an optical carrier level 3 (OC3) time division multiplexed (TDM) port, port 144(2) is a Gigabit Ethernet (GbE) port, and ports 144(3)-144(N) are ports configured to receive and transmit other packetized data. Also in one embodiment, communication line 146 transports framed data via port 148. Although illustrated as one communication line and one port, communication line 146 and port 148 represent any number of (e.g., eight) communication lines and ports, each of which is capable of transporting and receiving framed data according to the same or different framing protocols. In one embodiment of the present invention, transport units 114, 128 and 140 are each a Universal Transport System (UTS) 1100, a product of Ceterus Networks, Inc. of Delaware. For a complete description of a transport unit, refer to Ser. No. 10/403,840, entitled "METHOD AND APPARATUS FOR TRANSPORT OF PACKET-BASED DATA STREAMS OVER FRAME-BASED TRANSPORT SYSTEMS", having R. Butler, W. Szeto, R. Cantwell, R. Damle, and D. Nag as inventors, which is incorporated by reference herein in its entirety and for all purposes.

It will be noted that a variable identifier (e.g., "N", "M", etc.) is used in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of network 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Remote Management of a Network Device

It is desirable to manage one or more transport units 114, 128, and 140. For example, provision components installed on a remote system, collect performance data from the remote system (e.g., the number of error free frames received by the remote system), and request information of all the current standing alarms. For a number of reasons (e.g., distance between transport units, number of transport units, etc.) it would be advantageous to manage one or more transport units from one of many possible locations. It would also be advantageous that such a remote management scheme have a minimal impact on bandwidth and also be compatible with any number of frame-based communication protocols of core network 110. Accordingly, a remote management interface in accordance with the present invention is provided.

Continuing with the description of FIG. 1, each transport unit 114, 128, and 140 also includes a remote management interface 148, 150, and 152, respectively. A remote management interface in accordance with the present invention enables remote management of one or more remote transport units from a local transport unit by providing for the transmission and reception of remote management commands in a bandwidth efficient manner over any frame based network. In one embodiment of the present invention, the remote management commands are provided to the local transport unit by an access device coupled to the local transport unit. For example, FIG. 1 illustrates an access unit 154 coupled to transport unit 114 via communications link 156. In one embodiment, access unit 154 is a computer and communication link 156 is an internet protocol (IP) over Ethernet link (although communication link 156 can also be a serial link such as a RS232 link. Using embodiments of the present invention, it is thus possible to manage transport units 128 and/or 140 (and/or any number of additional transport units which may be coupled to network 110) via transport unit 114.

In one embodiment of the present invention, the remote management commands are instructions that can be executed by a processor on the remote system. The commands can be entered using a graphical user or a command line of an access unit coupled to a transport unit. Examples of tasks which may be performed on a remote transport unit include, login into a remote transport unit, provisioning of components of a remote transport unit, retrieving all standing alarms from the remote transport unit and file transfers (e.g., using file transport protocol) for FPGA loads, performance history, etc.

An Exemplary Transport Unit

Figure 2:
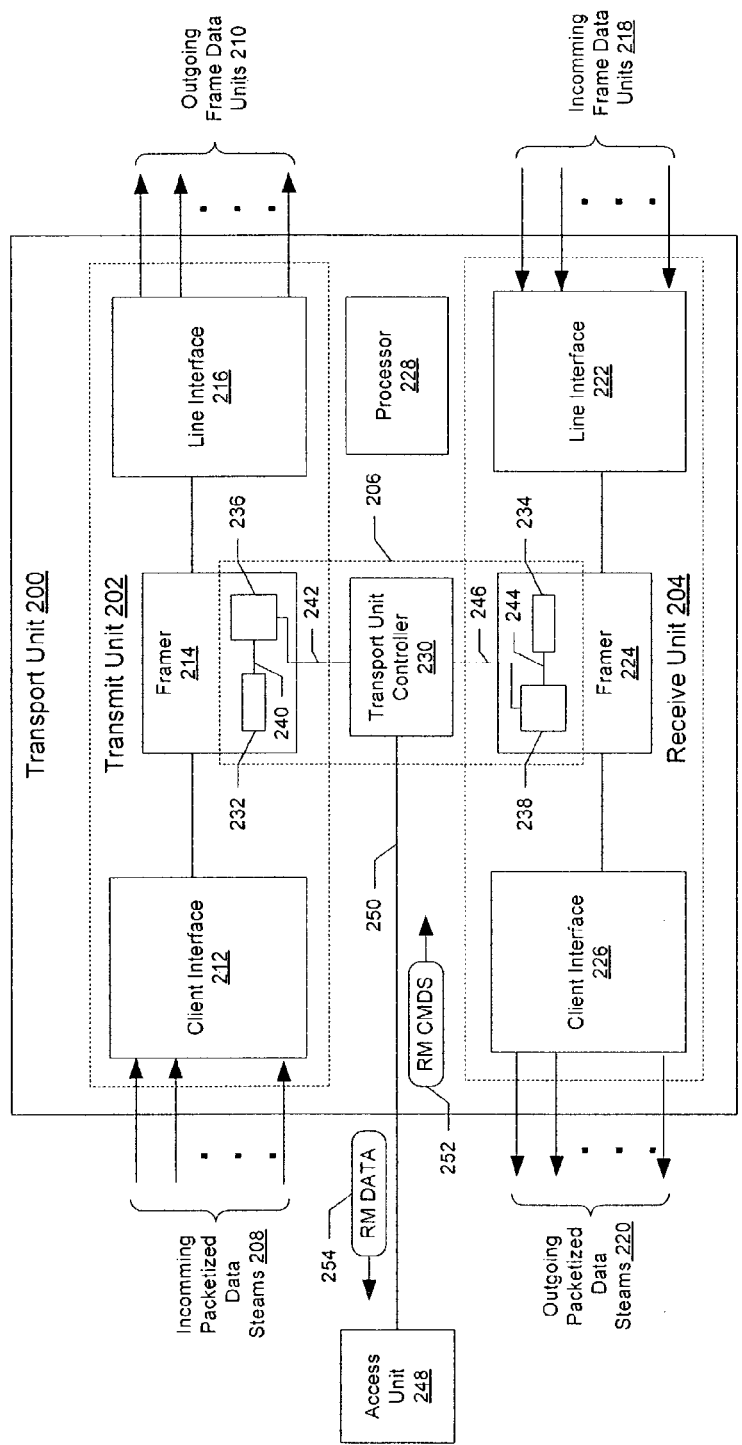
FIG. 2 is a block diagram illustrating the components of a transport unit employing the present invention.

FIG. 2 is a block diagram illustrating components of a transport unit 200 (similar to transport units 114, 128, and 140 of FIG. 1) employing the present invention. Transport unit 200 includes transmit unit 202, receive unit 204 and remote management interface 206 and processor 228. Transmit unit 202 receives a number of incoming packetized data streams 208 (e.g., from clients 112 of FIG. 1) and provides a number of outgoing frame data units 210 (e.g., to core network 110). Transmit unit 202 includes a client interface 212, a framer 214, and a line interface 216. Client interface 212 receives a number of incoming packetized data streams 208 and encapsulates the packetized data into payload data units (PDUs) (e.g., similar to the PDU illustrated in FIG. 5). Framer 214 receives PDUs from client interface 212 (and from transport unit controller 230) and distributes the PDUs to line interface 216 according to any number of prioritization schemes. Line interface 216 receives the PDUs, encapsulates the PDUs into Universal Transport Platform (UTP) frames, generates frame data units (e.g., for transmission over digital signal level 3 (DS3)) from the UTP frames, and provides outgoing frame data units (e.g., to core network 110).

Receive unit 204 receives frame data units 218 (e.g., from core network 110) and provides outgoing packetized data streams 220 (e.g., to clients 112). Receive unit 204 includes line interface 222, framer 224 and client interface 226. Line Interface 222 receives incoming data frame units 218 (e.g., from core network 110), extracts PDUs from the frame data units and provides the PDUs to framer 224. Framer 224 distributes PDUs to client interface 226 (and also to transport controller unit 230) according to the client identification included in every PDU. Client interface 226 receives the PDUs, extracts client data (e.g., as packetized data), and provides outgoing packetized data streams 220 (e.g., to clients 112). It will be recognized that although client interfaces 212 and 226 are illustrated as separate units, the functions of client interface 212 and 226 may be combined and performed by a single client interface. The same goes for framer 214 and 224 and also for line interface 216 and line interface 222.

Remote management interface 206 provides an interface for sending and receiving remote management commands to and from any number of transport units. Remote management interface 206 includes transport unit controller 230. Transport unit controller 230 operates as a general controller for transport unit 200 and is configured to carry out remote management commands and provide status or other data related to the remote management commands, if necessary. Transport unit controller 230 includes a number of registers (not shown).

Remote management interface 206 also includes remote management queues 232 and 234 and controllers 236 and 238. Remote management queue 232 is coupled to controller 236 via communication link 240. In one embodiment of the present invention, remote management queue 232 is a register configured to store a number of (e.g., 5) remote management PDUs. Controller 236 is coupled to transport unit controller 230 via communication link 242. In one embodiment of the present invention, communication link 242 is a serial data link (SDL) communication link, although any communication link can be used.

Remote management queue 234 is coupled to controller 238 via communication link 244. Remote management queue 234 is similar to remote management queue 232. Controller 238 is coupled to transport unit controller 230 via communication link 246. Communication link 246 is similar to communication link 242.

Transport unit controller 230 is also coupled to access unit 248 via communication link 250. Access unit 248 provides remote management commands 252 to transport unit controller 230 which in turn transmits the remote management command to controller 236. Transmit controller 236 encapsulates remote management commands 252 into a remote management PDU and transmits the remote management PDU to remote management queue 232. The remote management PDU is then distributed to line interface 216 by framer 214. In turn, line interface 216 formats the remote management PDU into a UTP frame and a frame data unit 210 and provides the frame data unit 210 to another transport unit (e.g., via core network 110) for remote management. Upon receipt of a frame data unit 210 encapsulating a remote management PDU, line interface 222 extracts the payload and transmits the payload to transport unit controller 230 for carrying out the remote management tasks. In one embodiment of the present invention, a graphical user interface on access unit 248 displays the status of both the local and remote transport unit.

In one embodiment of the present invention, access unit is a computer system including a processor (not shown) and computer readable media (not shown). Access device 248 may or may not be integrated with transport unit 200. Communication link 250 is an internet protocol (IP) over Ethernet link (although communication link 250 can also be a serial link such as a RS232 link).

An Exemplary Transmit Unit

Figure 3:
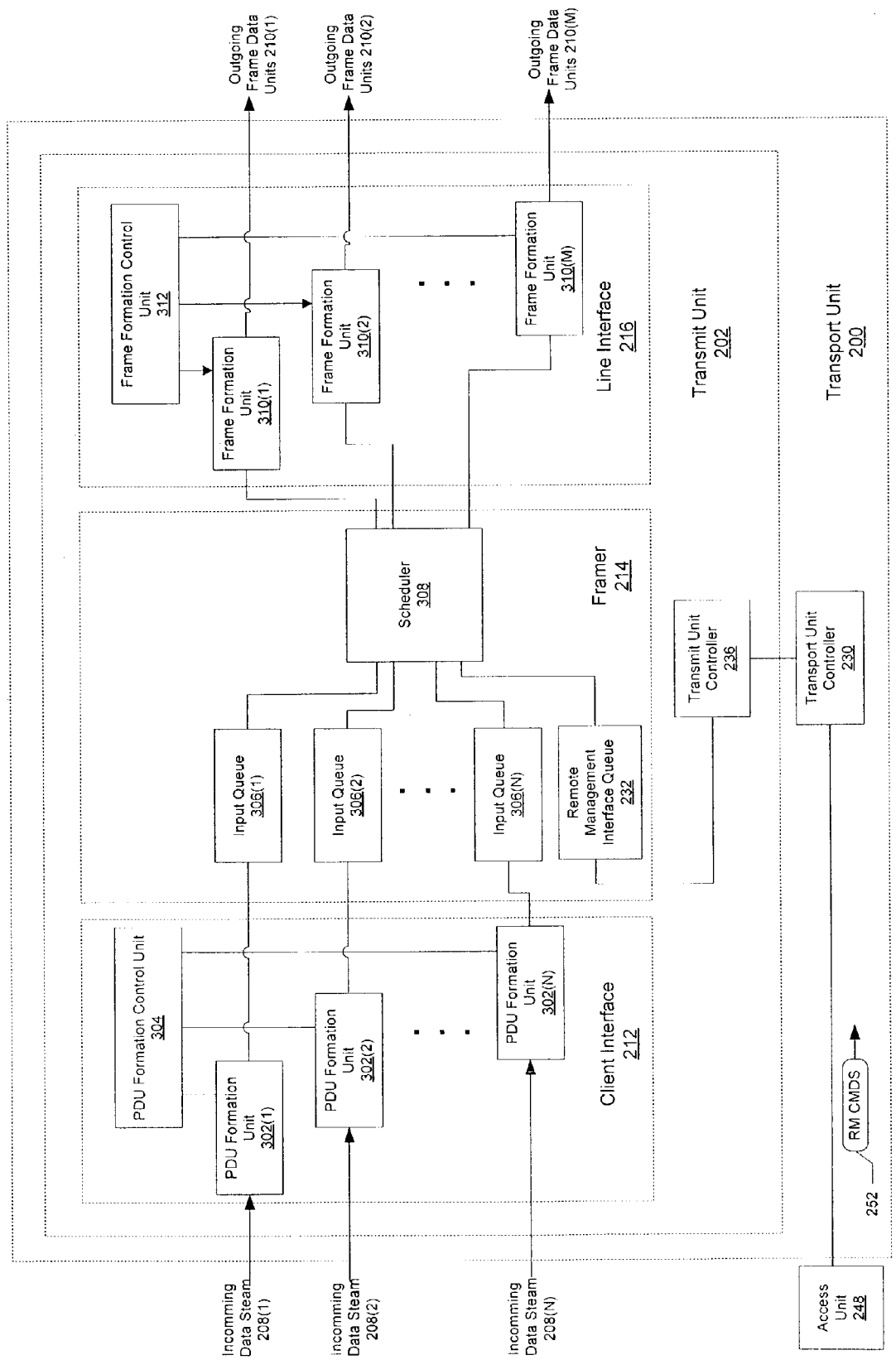
FIG. 3 is a block diagram illustrating in greater detail various portions of a transmit unit according to the present invention.

FIG. 3 is a block diagram illustrating in greater detail various portions of transmit unit 202. Transmit unit 202 receives a number of incoming datastreams (depicted as incoming datastreams 208(1)-(N)), which present data to transport unit 200 as packets. Transport unit 200 then translates these packets into payload data units (PDUs) and distributes these PDUs in a manner that allows for the formation of framed data. This framed data appears at the outputs of transport unit 200 as framed data units 210(1)-(M). Client interface 212 includes a number of PDU formation units (depicted as PDU formation units 302(1)-(N)) which are under the control of a PDU formation control unit 304. PDU formation units 302(1)-(N) take as their input the packets from incoming datastreams 208(1)-(N), and form PDUs from the data contained therein. In controlling this process of PDU formation, PDU formation control unit 304 also provides information for inclusion in the PDUs thus generated. This information includes, for example, each client's client identifier and that client's data rate, among other such possible information.

The purpose of PDU formation units 302(1)-(N) is to generate PDUs at the provisioned data rate unless framer 214 requests that PDU formation units 302(1)-(N) stop sending or ask for additional PDUs. Since the back-pressure is generated in the event that output bandwidth is not sufficient, PDU formation units 302(1)-(N) typically provide some amount of client data storage to avoid client data loss during transient channel failures.

PDU formation units 302(1)-(N) receive client data and generate PDUs based on the data rate provisioned for that client. The provisioned client data rate can be smaller than the actual input data rate if the client is a data client (e.g., an Ethernet datastream). For a client transmitting TDM data (e.g., a SONET datastream), the provisioned data rate should be equal to the incoming data rate. It will be noted that, for a TDM client, the actual outgoing PDU data rate is slightly greater than the input client data rate (e.g., output data rate= (519/512)*client data rate). This represents the additional PDU overhead (e.g., 7 bytes, in the posited case) that is added (e.g., for every 512 bytes of incoming client data bytes, in the posited case). Thus generated, the PDUs are provided to framer 214 for collection and distribution.

Framer 214 includes a number of input queues 306(1)-(N), which are coupled to a scheduler 308. Scheduler 308, takes in the PDUs presented by input queues 306(1)-(N) and, using a scheduling methodology (e.g., strict-priority round-robin (SPRR) scheduling), scheduler 308 distributes PDUs to the various inputs of line interface 216 for use in the formation of framed data units.

Line interface 216 receives the scheduled PDUs at one of a number of frame formation units (depicted as frame formation units 310(1)-(M)). Frame formation unit 310(1)-(M), under the control of a frame formation control unit 312, receive PDUs from scheduler 308 of framer 214, and in turn, generate the framed data units that are presented to a network access unit as frame data units 210(1)-(M), for transmission via core network 110. In addition to controlling the formation of frame data units 210(1)-(M), frame formation control unit 312 provides data rate and channel identification information to each of frame formation units 310(1)-(M), for use in the creation of frame data units 310(1)-(M), among other such possible information. In one embodiment, framed data units 310(1)-(M) are formatted as universal transport protocol frames, which can then be encapsulated into a specific outgoing interface frame format (e.g., for transmission over digital signal level 3 (DS3)).

The purpose of frame formation units 310(1)-(M) is to receive PDUs from scheduler 308, form a UTP frame and send the UTP frame out at the UTP channel data rate. All frame formation units 310(1)-(M) should send out a UTP frame in unison. Frame formation units 310(1)-(M) receive PDUs from scheduler 308 and sends them out at the provisioned channel data rate. Frame formation units 310(1)-(M) send out a UTP frame overhead every N PDUs (N=303, for embodiments discussed herein, although it will be apparent that this number will change, based on the configuration of the given transport unit). In the event that there is no PDU, an empty PDU is generated and sent out.

In addition to transmitting client data as described above, transmit unit 202 also transmits remote management commands 252 received from access device 248. In one embodiment of the present invention, remote management commands 252 are provided by access unit 248 in a block of as much as 512 bytes (e.g., an administrator or other person with access may enter remote management commands at access unit 248 in order to remotely manage a transport unit coupled to local transport unit 200). Transport unit controller 230 receives remote management commands 252 and transmits the commands to transmit unit controller 236. Transmit unit controller 236 encapsulates the block of data in a PDU (e.g., PDU 500 of FIG. 5) and assigns a unique identifier identifying the PDU as a remote management PDU. In one embodiment of the present invention, the unique identiFier is provided by setting all bits in the client identifier field of the payload data unit equal to 1 (the fields of a PDU are described in greater detail with respect to FIG. 5).

Transmit unit controller 236 then transmits the remote management PDU to remote management interface queue 232. Remote management interface queue 232 is a queue reserved for temporarily storing remote management PDUs for distribution by framer 214. In one embodiment of the present invention, remote management interface queue 232 has a priority such that remote management PDUs are distributed from remote management interface queue 232 before all other input queues 306 except those input queues which are utilized for TDM ports. Once selected by scheduler 308, the remote management PDU is provided to an available frame formation unit 310. Frame formation unit 310 encapsulates the remote management PDU into a UTP frame along with other PDUs it receives.

In order to provision bandwidth, framer 214 may request that transmit unit controller 236 stop sending remote management PDUs, or to decrease the amount of remote management PDUs sent. Since this back-pressure is generated in the event that output bandwidth is not sufficient, transmit unit controller 236 typically provides some amount of temporary data storage to avoid data loss.

Figure 4:
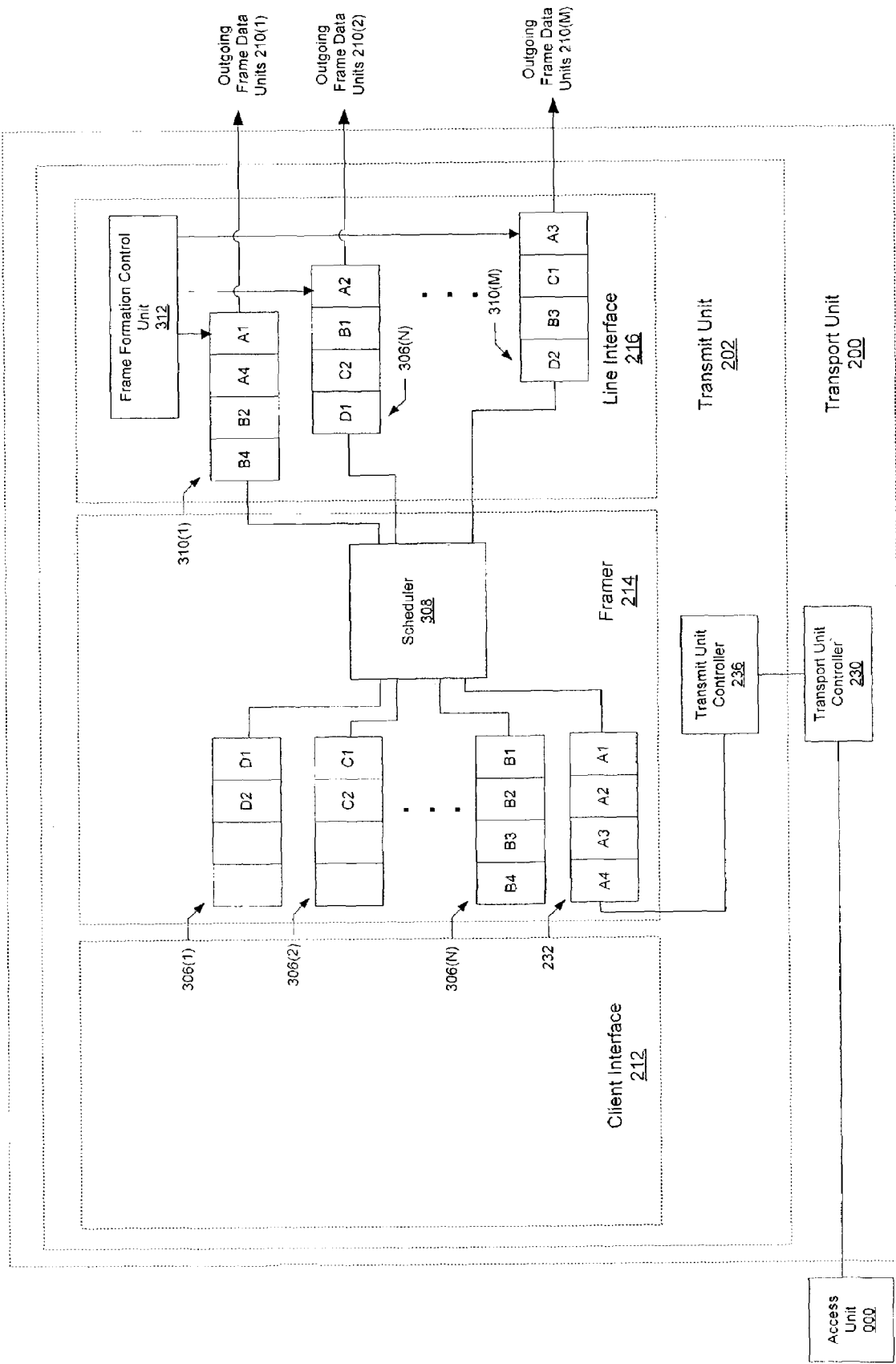
FIG. 4 is a block diagram illustrating a technique for distributing remote management data according to one embodiment of the present invention.

FIG. 4 is a block diagram illustrating a strict priority round robin (SPRR) technique for distributing remote management data according to one embodiment of the present invention.

As shown in FIG. 4, input queues 306 contain a number of PDUs. Input queue 306(1) includes PDUs D2 and D1, input queue 306(2) includes PDUs C2 and C1, and input queue 306(N) includes PDUs B4, B3, B2, and B1. Also, remote management queue 232 includes PDUs A4, A3, A2, and A1.

In the presently described embodiment, remote management queue 232 has the highest level of priority, input queues 306(2) and 306(N) have the next highest level of priority and also the same level of priority with respect to each other, and input queue 306(1) has the lowest level of priority. Because remote management interface queue 232 has the highest level of priority, all remote management PDUs are distributed from remote management interface queue 232 until none are left to distribute. Thus, remote management PDU A1 is first distributed to frame formation unit 310(1), remote management PDU A2 is distributed to frame formation unit 310(2), remote management PDU A3 is distributed to frame formation unit 310(M), and remote management PDU A4 is distributed to frame formation unit 310(1). Once all of the remote management PDUs have been distributed, scheduler 308 distributes PDUs from the next highest priority queue, input queues 306(2) and 306(N).

Because input queues 306(2) and 306(N) have the same level priority, PDUs are distributed from their queues in round robin fashion. Accordingly, PDU B1 is distributed to frame formation unit 310(2), PDU C1 is distributed to frame formation unit 310(M), PDU B2 is distributed to frame formation unit 310(1), PDU C2 is distributed to frame formation unit 310(2), PDU B3 is distributed to frame formation unit 310(M), and PDU B4 is distributed to frame formation unit 310(1).

Once all of the B and C PDUs have been distributed, scheduler 308 distributes PDUs from the next highest priority queue, input queue 306(1). PDU D1 is distributed to frame formation unit 310(2) and PDU D2 is distributed to frame formation unit 310(M). If during the distribution of the B, C or D PDUs a remote management PDU were provided to remote management interface queue 232, distribution of the B, C, or D PDUs is stopped so that the remote management PDUs can be distributed.

A remote management PDU in accordance with the present invention provides remote management commands to a remote transport unit for execution by the remote transport unit. For example, in one embodiment of the present invention, the remote management commands are instructions that can be executed by a processor on the remote system. The commands can be entered using a graphical user or a command line of an access unit coupled to a transport unit. Examples of tasks which may be performed on a remote transport unit include, login into a remote transport unit, provisioning of components of a remote transport unit, retrieving all standing alarms from the remote transport unit and file transfers (e.g., using file transport protocol) for FPGA loads, performance history, etc.

Exemplary Payload Data Unit

FIG. 5 a block diagram of a payload data unit (PDU) generated by a transport unit according to one embodiment of the present invention. A PDU 500 is depicted as including a payload 510 and a PDU overhead section 515. Payload 510 can include client data or remote management commands. The flields of PDU overhead section 515 include a client identifier field 520, an extension field 530 (which includes a client identifier extension field 532, an SPRR start bit 534, a data length field 536 and a sequence number field 538), a PDU sequence number field 540, a data length field 550 and a header error control (HEC) field 560. Also included in PDU 500 is a parity information field 570.

In one embodiment, every PDU includes up to 512 bytes of payload data encapsulated by a PDU overhead section (e.g., PDU overhead section 515) at the head of the PDU, and a parity byte (error correction information field 570) at the tail of the PDU. The direction of transmission implies that the first byte of the PDU overhead is the first byte of a PDU that is transmitted and the PDU's parity byte is the last byte that is transmitted. While, in an embodiment such as is described herein, a fairly elaborate PDU overhead is defined to accommodate the functionality across several UTS implementations, need not be the case. The use of a flexible PDU structure makes the interoperability of a variety of transport unit architectures easier by managing PDU streams based on their client identifiers. Therefore, as far as possible, it is preferable to use a standardized PDU definition across all available protocol versions that are optimized for a particular application (e.g., access applications may require a smaller number of PDUs per frame with some variations in overhead information 610). The definitions of the fields that are included in PDU overhead section 515, as well as their functions, are now discussed.

In one embodiment, client identifier field 520 plus the 4 most-significant bits of extension field 530 form the PDU's client identifier (Client_ID). This large number of client IDs (>1 million, when client identifier field 520 is two bytes in length) are meant to uniquely identify each client going through all the transport units in a network. Since an objective is to allow various implementations of the transport unit architecture (for example, in access, metro and core products) to interoperate, a large number of client IDs are preferable to identify a client that may come into a transport unit network at any point (e.g., a client with a Client_ID=20 may enter a network through a transport unit providing basic network access, while a client with a Client_ID=65000 may enter the network through a transport unit providing core access). An example of reserved Client_IDs is given in Table 4.

TABLE 4

Reserved Client_IDs.

| Client_IDs | Reserved As | Usage Notes |
| --- | --- | --- |
| All 0s (20 bits) | Empty PDU | This Client_ID is used to indicate an empty PDU that does not belong to any client. An empty PDU is inserted into a CCP channel during a PDU distribute interval if there aren't enough client PDUs to send. |
| All 1s (20 bits) | Management PDU | This Client_ID is used to indicate a PDU that contains a management message sent by the local management system to the remote system. |

In one embodiment, the least-significant bit of extension field 530 plus PDU sequence number field 540 form a 9-bit PDU sequence number (Sequence_Num). In such an arrangement, the least-significant bit of the Sequence_Num is bit 0 of extension field 530. This sequence number indicates the sequence number of the PDU within a frame. In this embodiment, the first PDU of every frame starts with Sequence_Num=0. The use of sequence numbers allows faster frame synchronization per channel. This mechanism can also be used to check the integrity of PDUs as the PDUs are transferred from one channel to another in a core application.

In one embodiment, SPRR start bit 534 is the third bit in extension field 530. SPRR start bit 534 is used to guarantee that the payload is regenerated in the original sequence when SPRR distribution with even distribution across all active channels is implemented. Optionally, if at every PDU distribution cycle, the data PDUs are distribution starting from sub-channel 0, then this bit is not used. In the SPRR distribution scheme with even distribution across all active channels, SPRR start bit 534 indicates the first data PDU that is sent during a PDU distribute cycle. SPRR start bit 534 is then used by the receive side of a transport unit to determine from which sub-channel the SPRR PDU extraction should begin.

Data length field 536 and data length field 550 of the PDU's data length, with bits 1 and 2 of extension field 530 forming the two least-significant bits of the data length, and data length field 550 forming the most-significant byte. The PDU's data length is equal to, and the data length fields indicate, the number of client data bytes in the 512-byte PDU payload area starting from the first byte after HEC field 560.

HEC field 560 contains header error control information. This HEC information can be generated, for example, in a manner such as that used in generating the HEC information for the asynchronous transfer mode (ATM) protocol. Such a correction code allows error checking with 1 bit correction of the Client_ID, extension byte and sequence number fields of the PDU overhead.

Parity information field 570 provides parity information for the PDUs payload. In one embodiment, parity information field 570 is the byte after the 512 byte PDU payload space (i.e., client data 510). Parity information field 570 sets odd parity across the 512 byte PDU payload space on a bit-by-bit basis (e.g., bit 0 of the parity information field 570 sets an odd parity across the bit 0's of all the bytes in the PDU payload space).

Exemplary Universal Transport Frame

FIG. 6 is a block diagram of universal transport (UTP) frame generated by a transport unit according to one embodiment of the present invention. Frame 600 includes overhead information 610 as well as a payload 620. The format of overhead information 610 and PDUs 630(1)-(N) are now discussed in greater detail with respect to FIG. 7.

FIG. 7 is a block diagram illustrating in greater detail the overhead section of a UTP frame according to one embodiment of the present invention. FIG. 7 is a block diagram illustrating an example of the fields within overhead information 610 according to the embodiment of the present invention. As depicted in FIG. 7, overhead information 610 includes a start-of-frame (SOF) 700, a group identifier field 705, a channel identifier field 710, a frame count field 720, a protocol version field 725, a communication channel field 730, a channel bitmap 735, an error condition field 740, a channel capacity field 745, an alternate channel information field 750, an expansion area 755, and an error correction information field 760. The purpose and use of each of these overhead information fields is now described.

In one embodiment of the present invention, SOF 700 is 2 bytes, and allows the receiving transport unit (e.g., receive side) to synchronize on the incoming sub-channel frame. In one embodiment, the first byte transmitted is 0xAA, while the second byte transmitted is 0xA5, and the SOF sequence is not scrambled before transmission.

The function of group identifier field 705 is to allow the receiving transport unit to verify that the connection (for the group of channels) is received from the intended transmitting transport unit. This feature is important in backbone network applications, as a result of the difficulties in tracing the physical path of all the channels through a network. This is particularly important because the separation between the receiving and transmitting transport units is often substantial (e.g., 1000 km or more) with several transport network elements between them. In one embodiment, the value of group identifier field 705 is between 0 and 65536, with 0x0000 being reserved for AIS frame. An AIS frame has basic frame information in its overhead, with all the PDUs being empty. To allow the user to maintain connection accuracy across the network, each UTP group in the network can be provisioned with a different group identifier (up to a maximum of $2^{16}$=65536). At "Power ON," group identifier field 705 is initialized by the system control software.

Channel identifier field 710 includes a channel identifier (the 7 LSBits) and an active indicator bit (the MSBit). The function of channel identifier field 710 is to allow the receiving transport unit to identify individual channels within a UTP group. Channel identifier field 710 also indicates the round-robin sequence in which the payload units are distributed across the individual channels, allowing the receiving transport unit to accurately extract the payload. The active bit is set by the transmitting transport unit when the transmitting transport unit receives a bitmap from the far-end receiving transport unit, indicating that the channel is tested and can be used. The transmitted bitmap is nearly a reflection of the received bitmap. When a channel is indicated to be in use, the transmitting transport unit sends real data through the PDUs. The transmitting transport unit looks at the received bitmap every PDU time. If any bit is cleared, the transmitting transport unit sends and empty PDU immediately following the change. However, if any bit is set, the transmitting transport unit begins sending user data in the frame following setting the active bit.

Channel identifiers preferably start at 0 and proceed in ascending order, increasing up to the maximum number of channels supported by the transport unit. A maximum of 128 sub-channels can be supported by a 7 bit channel identifier field. Although a 7 bit channel identifier can support up to 128 channels, only 0 through 63 channels are valid in one embodiment of the present invention, as a result of the 64 bit channel bitmap that is used for channel protection.

Frame count field 720, which is 4 bytes in length in some embodiments, functions to maintain a count of the number of frames transmitted since power on or the last counter rollover. The frame count stored in frame count field 720 is also used to synchronize and de-skew the active sub-channels within a UTP group before the payload is extracted.

A 4 byte frame count can count up to 4,294,967,296 consecutive frames before rolling over. This corresponds to approximately 149.131 hours at a 10 Gb/s frame transmission rate. In one embodiment, the most-significant byte of the frame counter is the first byte to be transmitted, while the least-significant byte of the counter is the last byte to be transmitted. Preferably, all channel frames are generated and transmitted by the transmitting transport unit at the same clock. That being the case, all the channel frames leaving the transmitting transport unit at any time should have the same frame count.

Protocol version field 725 stores a protocol version number (e.g., 2 bytes), the function of which is to allow changes to be made to the protocol (e.g., to OH, as well as to the PDU structure) in order to adapt the original protocol either for optimization to an application (e.g., DS3 channel rate versus 10 Gb/s channels ) or add functionality to handle newly identified scenarios. The scenario indicated by the information stored in protocol version field 725 can be used to keep a track of such changes, as they are needed. Initially, the value stored in protocol version field 725 indicates a version level of 0. Changes to the protocol can be tracked by keeping a separate document per version that details the OH and PDU definitions of that version. This document should also have a description of any new mechanisms related to the changes made.

Communication channel field 730, which can also be referred to as user accessible bytes (UAB) (e.g., 4 bytes), allow a transport unit's user to send and receive information to and from a remote network element. In one embodiment, the bytes of communication channel field 730 are defined as follows. The first byte transmitted is the most-significant byte of the message, followed by succeedingly less-significant bytes. These bytes are accessible directly through registers within the transmit and receive sides of a transport unit. The user can elect to send different information on each channel or the same information on all the channels depending on the protection needs of the given application.

Channel bitmap 735, which can also be referred to as a local receive channel bitmap (e.g., 8 bytes), provides the following functions. Generated by the local transport unit's receive side to indicate to the far-end transport unit's transmit side which of the channels are error-free and within skew limits, and which are not. This is a way to implement individual channel level fast protection and restoration at layer one of the networking protocols. This also allows the user of such systems to manually provision or de-provision a channel as needed.

The definition of the bits used in the channel bitmap 735 is as follows. In one embodiment, a 64 bit bitmap is used, with the most-significant bit of the first byte corresponding to a channel identifier of 63, and successively less-significant bits representing successively lower channel identifiers, down to the least-significant bit corresponding to a channel identifier of 0. In this case, the most-significant bit of the first byte is transmitted first and successively less-significant bits transmitted thereafter, in order of decreasing significance.

In operation, a network according to the present invention provides the following features. An error on a received channel is indicated to the far-end transmitting transport unit by clearing the corresponding bit in the bitmap. It will be noted that the bitmap carried on all the channels should be identical. This is done to ensure that the bitmap reaches the far-end transmitting transport unit even with only a single working channel operational in the reverse direction. In the normal case, with multiple channels operational, the far-end receiving transport unit sends an authenticated bitmap to the adjacent transmitting transport unit. In one embodiment, the authenticated bitmap is generated by logically ANDing all the valid copies of the bitmap. At "Power ON," the first bitmap transmitted by the transmitting transport unit should be all zeros. The bitmap in the following frame is the one received from the receive side of the local transport unit as good frames per channel are received. Each bit in the bitmap received from the receive side can be individually overridden by the user through dedicated registers. This feature allows the system user to manually take individual channels in and out of service (e.g., for repairs). In one embodiment, channel bitmap 735 (as a bitmap with up to 64 bits) supports only 64 channels (i.e., a channel identifier (Ch_Id)=0 to 63), while channel identifier field 710 can support up to 128 channels. Additional bytes can be added to overhead information 610 following the currently defined channel bitmap for use in supporting up to 128 channels (or more). It will be noted that channel identifiers that are not supported by the bitmap implemented should be considered invalid.

Error condition field 740 includes error condition bytes (e.g., 2 bytes) and a primary label-switched path (PLSP) byte (the third byte of error condition field 740). The error condition bytes that are used to inform the transmit side of the far-end transmitting transport unit of error conditions seen by the receive side of the local transport unit. The transmission order and bits representing error conditions are as given in Tables 1 and 2.

TABLE 1

Layout of the first error condition byte.

| Bit 7 (MSB) | Bit 6 | Bit 5 | Bit 4 | Bit 3 | Bit 2 | Bit 1 | Bit 0 (LSB) |
|---|---|---|---|---|---|---|---|
| CH_ID Error | Channels excluded due to excess skew | RDI in response to AIS frame received | CRC Error Degradation beyond threshold | Loss-of-Signal (LOS) | Loss-of-Frame (LOF) | BER Degradation beyond threshold | Forced/Manual Switch |

TABLE 2

Layout of the second error condition byte.

| Bit 7 (MSB) | Bit 6 | Bit 5 | Bit 4 | Bit 3 | Bit 2 | Bit 1 | Bit 0 (LSB) |
|---|---|---|---|---|---|---|---|
| Unused | Unused | Unused | Unused | Unused | Unused | Unused | CH_ID Error |

In the embodiment described above, if more than one channel has distinct error conditions such as a BER degradation beyond threshold and LOS, the error condition bits do not resolve which of the channels has BER degradation and which one has LOS. This could be remedied by encoding such information and conveying that encoded information within overhead information 610, but this would consume bandwidth and reduce the frame structure's efficiency. Typically, the error condition bytes are generated only for those sub-channels that are provisioned to be active at the receive side of the receiving transport unit. This is to avoid standing alarms in the error condition bytes even when some of the channels are not used/connected.

Channel capacity field 745, also referred to as UTP group capacity bytes (e.g., 2 bytes), which includes a primary capacity rate byte (a PRCap_Rate byte (1 byte)) and a primary link capacity byte (PRCap_Links byte (1 byte)). The function of channel capacity field 745 is as follows. In the case where a regenerating transport unit is used to translate between two back-to-back UTP groups with different data rates (per channel data rates; e.g., translation between 4×10 Gb/s and 5×2.5 Gb/s datastreams). The UTP group capacity bytes within channel capacity field 745 inform the originating transmit transport unit about the smallest capacity in the regenerated spans.

In one embodiment, the PRCap_Rate byte is defined as follows. The most-significant nibble of the PRCap_Rate byte is the user configured nibble representing the data rate of the originating transport unit's (transmit side) channels. If the next transport unit is a regenerating transport unit, this nibble is used to define the most-significant nibble of the outgoing PRCap_Rate byte representing its output channel data rate. The least-significant nibble of the PRCap_Rate byte is the rate information generated by the local transport unit (receive side) or regenerating transport unit to be used by the far-end transport unit.

The PRCap_Links byte carries the number of working channels verified by the local receive side of the regenerating transport unit. This is also equal to the number of bits set in the corresponding channel bitmap 735 generated by the receiving transport unit or regenerating transport unit. Preferably, the PRCap_Rate nibble generated by the given receive side is initialized to [0000] and the PRCap_Links is initialized to 0.

Alternate channel information field 750, which carries alternate channel protection information (ACPI), is 25 bytes of information, in one embodiment. The function of the ACPI carried by alternate channel information field 750 is to carry the channel bitmap, UTP group capacity information and the error condition bytes of an alternate UTP group, for use if the UTP group in the return direction is not available. The alternate UTP group that the protection and UTP group capacity information belongs to is indicated by an alternate Grp_Id_Alt field. The path of the alternate UTP group protection information is transferred between the primary and alternate UTP groups via the local and far-end system controllers (universal transport system controllers (UTSCs)).

Depending upon the implementation and the difference in the transmission delays of the two UTP groups, the arrival of the bitmap at any transmit side of a transport unit via the alternate UTP group can be delayed by multiple frames. The channel bitmap (sub-channel bitmap 735) received by a transmit side of a transport unit via the alternate UTP group can also be used to authenticate the channel bitmap received from the receive side during normal operation.

Expansion area 755 can include expansion bytes, to be used for future expansion of the currently defined bytes, as well as unused bytes. These unused bytes can be used as proprietary bytes during implementation, or defined later to satisfy new requirements.

Also provided is error correction information field 760, which allows for the storage of error detection/correction information (e.g., CRC 32 information, 4 bytes in length). This can be, for example, a CCITT standard CRC calculated over the frame header bytes with a divisor=0x04C11DB7 and initial remainder=0xFFFFFFFF.

An Exemplary Receive Unit

Figure 8:
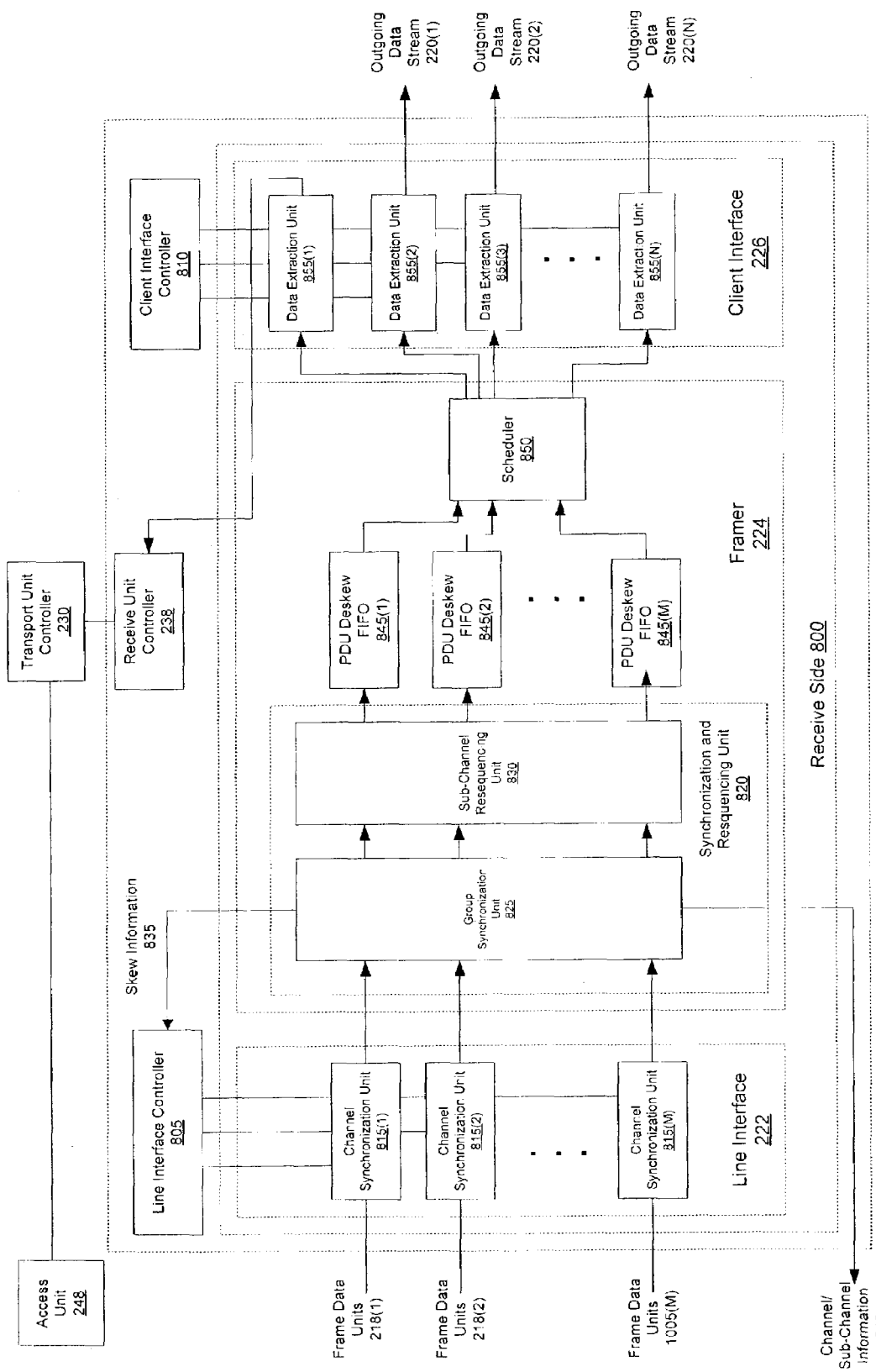
FIG. 8 is a block diagram illustrating the components of a receive unit for use in a transport unit employing the present invention.

FIG. 8 is a block diagram illustrating a received side 800 of transport unit 200 depicting the modules used to convert framed data (received as frame data units 218(1)-(M)) and provided to local clients as a packetized data stream (depicted in FIG. 8 as outgoing data streams 220(1)-(N)) (receive side 800 is also similar to the receive side of transport units 114, 128, and 140 of FIG. 1). Received side 800 includes a number of sections that provide for this translation. These sections include a line interface 222 (under the control of a line interface controller 805), framer 224, and, under the control of a client interface controller 810, client interface 226.

Line interface 222 includes a number of channel synchronization units (depicted in FIG. 8 as channel synchronization units 815(1)-(M)), each of which is under the control of line interface controller 805. The purpose of channel synchronization units 815(1)-(M) is to identify and delineate the frame on a per channel basis. Channel synchronization units 815(1)-(M) identify the incoming frame based on frame overhead (e.g., overhead information 610) as well as PDU overhead (e.g., PDU overhead section 515). Overhead information 610 is delineated using the SOF pattern (e.g., 0xAA followed by 0xA5) at the beginning of the frame and error correction information field 760 (e.g., CRC 32) after a standard delay (e.g., 76 bytes). The number of bytes in overhead information 610 can be different, based on version information in protocol version field 725. Alternatively, information in PDU overhead section 515 can be used to reduce the time required for frame delineation and synchronization. Channel synchronization units 815(1)-(M) also provide overhead information to line interface controller 805.

Once the frames received as framed data units 218(1)-(N) are received and synchronized by channel synchronization units 815(1)-(N), respectively, the incoming PDU streams are passed to framer 224, and more particularly, to a synchronization and resequencing unit. Synchronization and resequencing unit 820 includes a group synchronization unit 825 and a channel resequencing unit 830. When the PDU streams are passed to group synchronization unit 825, group synchronization unit 825 both synchronizes the PDUs based on their respective groups, but also generates skew information that can be passed to line interface controller 222 for use by channel synchronization units 815(1)-(N) in synchronizing the incoming channels of framed data. Group synchronization unit 825 provides this skew information to line interface controller 805 via a skew information signal 835. Group synchronization unit 825 also generates channel/sub-channel information 840. Channel information 840 includes channel bitmap information, channel rate capacity, and channel link capacities. This information is provided to transmit side 202 for transmission to the distribution unit of the far-end transport unit. This supports the various error detection and error handling functionalities described with regard to the frame and PDU format discussed previously.

The purpose of synchronization and resequencing unit 820 is to identify the largest group of channels having the same frame count and arrive within a specified skew time limit (measured in numbers of PDUs), and to forward these PDUs on for deskewing and distribution. Group synchronization unit 825 receives the SOF arrival time and the frame counts from all the channels that are frame-synchronized.

After group synchronization has been performed on the incoming PDU streams by group synchronization unit 825, group synchronization unit 825 passes the now-synchronized PDU streams to channel resequencing unit 830 Channel resequencing unit 830 resequences the PDUs in the incoming PDU streams according to their channel identifier fields in order to place the PDUs in the proper sequence for extraction.

After group synchronization and channel resequencing by synchronization and resequencing units 820, the PDU streams are passed to a corresponding one of PDU deskew FIFOs 845(1)-(M). As their name implies, PDU deskew FIFOs 845(1)-(M) perform deskewing on the frames that are presented at their input. By buffering the PDU streams, PDU deskew FIFOs 845(1)-(M) compensate for arrival time variances at their inputs, by making PDUs available to a scheduler 850 at the appropriate times. According to one embodiment of the present invention, scheduler 850 performs PDU extraction using a strict-priority round-robin methodology. Under the control of client interface controller 810, data extraction units within client interface 226 (depicted as data extraction units 855(1)-(N)) receive PDUs distributed by scheduler 850 and extract the client data therein by decapsulating such data. This decapsulation by data extraction units 855(1)-(N) results in outgoing data streams 220(1)-(N).

Receipt of a Remote Management Command

Continuing with the description of FIG. 8, upon receipt of a remote management PDU (identified in one embodiment by all bits in the client id field of the PDU set to 1), the received payload is extracted by one of data extraction units 855 and an interrupt is sent to transport unit controller 230 by receive unit controller 238. Transport unit controller 230 then requests transfer of the received payload. In one embodiment, the received payload is transferred to transport unit controller 230 as one block of as much as 512 bytes. Upon receiving the payload, transport unit controller 230 carries out the requested remote management command. If it is necessary to send a response to the local transport unit, the same process described above with respect to the transmission of a remote management command is repeated, however without the need of access unit 248.

Figure 9:
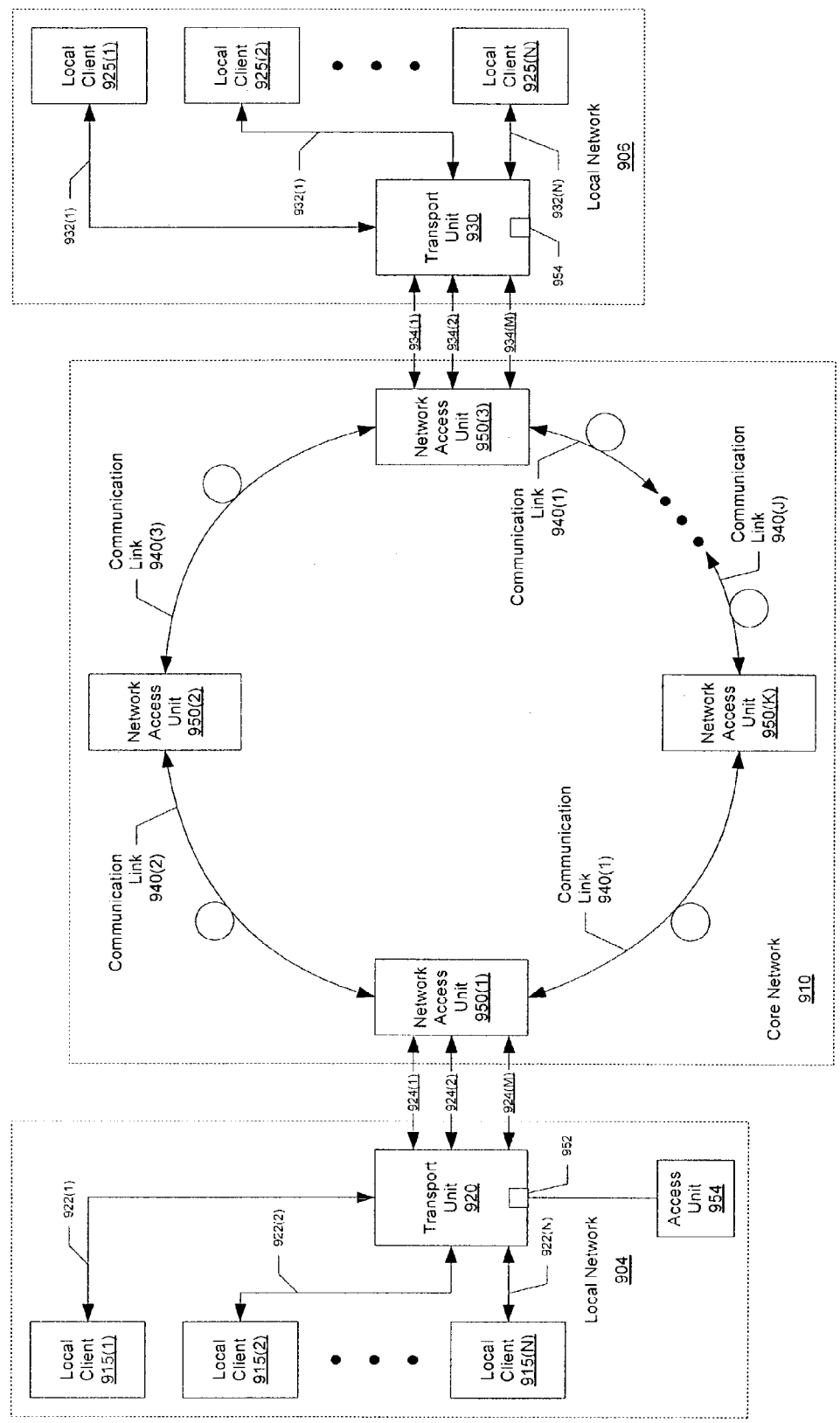
FIG. 9 is a block diagram of an exemplary network configuration of a number of transport units employing the present invention.

FIG. 9 is a block diagram of an exemplary network configuration of a number of transport units employing the present invention. Network 900 includes local networks 904 and 906. Local networks 904 and 906 communicate with one another via a core network 910. Local network 904 includes a number of local clients (depicted as local clients 915(N)), which are coupled to a transport unit 920 via communication lines 922(1)-(N). In turn, transport unit 920 is coupled to core network 910 by communication lines 924(1)-(M). In certain embodiments of the present invention, communication lines 922(1)-(N) carry packet data streams (i.e., datastreams in which the data being transported has been divided into packets). In contrast, using such an embodiment, data carried by communication lines 924(1)-(M) are transported using a frame-based protocol (i.e., a protocol in which the data being transported is loaded into frames).

Similarly, local network 906 includes a number of local clients (depicted as local clients 925(1)-(N)) which are coupled to a transport unit 930 via a number of communication lines (depicted as communication lines 932(1)-(N)). Also in a manner similarly to that previously discussed, transport unit 930 is coupled to core network 910 via a number of communication lines 934(1)-(M). As before, communication lines 932(1)-(N) carry data in a packetized format, while communication lines 934(1)-(M) carry data in a frame-based format. Providing communications between local networks 904 and 906, core network 910 supports such communications via a number of communication links 940(1)-(J). Communication links 940(1)-(J), in one embodiment of the present invention, interconnect a number of network access units (depicted in FIG. 9 as network access units 950(1)-(K)). As is apparent from FIG. 9, core network 910 is depicted as employing a ring topology. However, as will be apparent to one of skill in the art, core network 910 can be configured in any of a number of topologies, and employ any one of a number of protocols for transferring the frame-based data received from local networks 904 and 906 to one another. In the topology depicted in FIG. 9, network access unit 950(1)-(K) can be implemented, for example, using add/drop multiplexers (ADM).

As illustrated transport units 920 and 930 include a remote management interface 952 and 954, respectively. As described above, a remote management interface in accordance with the present invention enables remote management of one or more remote transport units (e.g., transport unit 930) from a local transport unit (e.g., transport unit 920) by providing for the transmission and reception of remote management commands in a bandwidth efficient manner over any frame based network. In the embodiment illustrated in FIG. 9, the remote management commands are provided to the local transport unit by an access device 954 coupled to the local transport unit.

Displaying Remote Management Data

Figure 10:
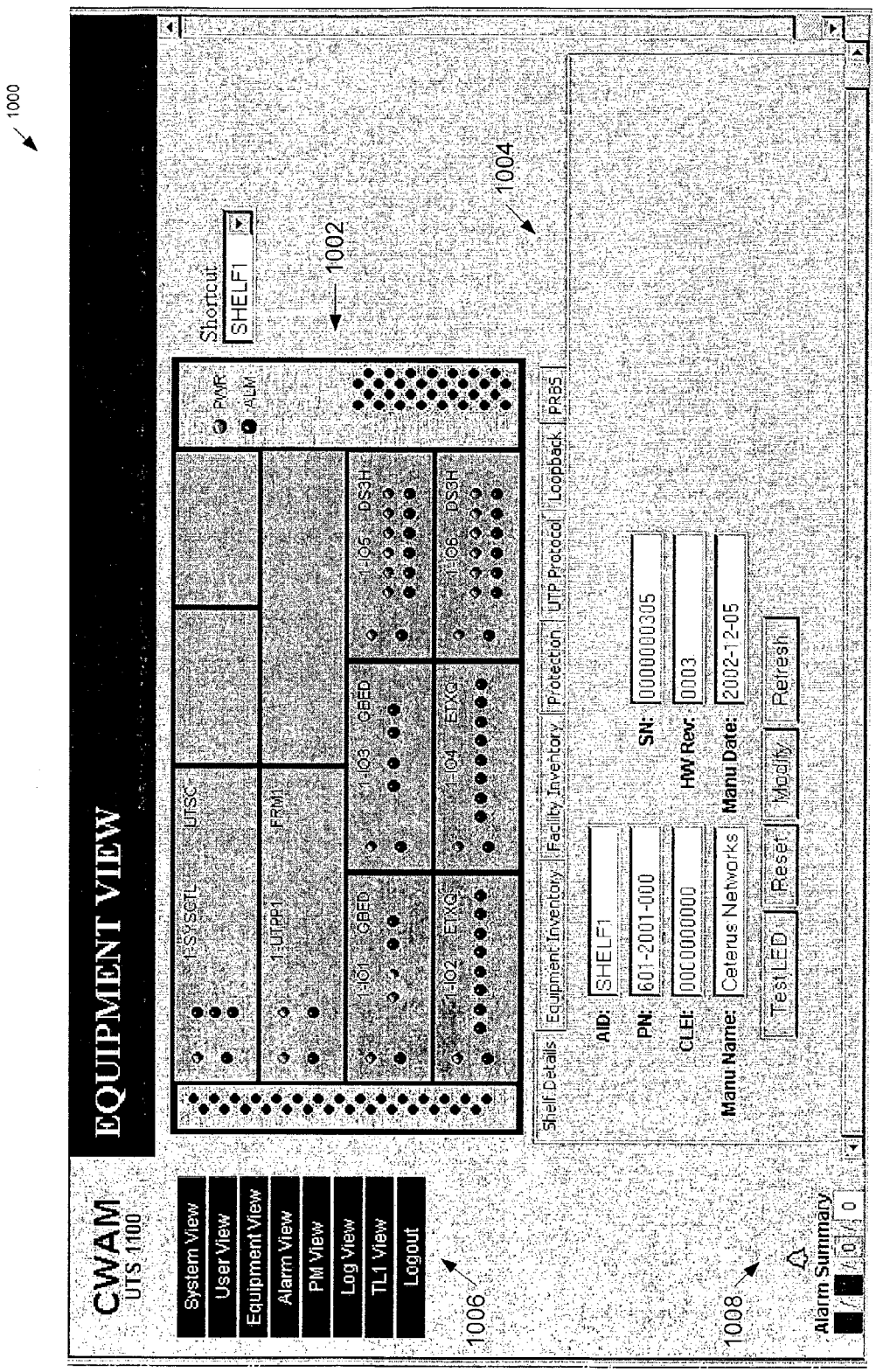
FIG. 10 is a screen shots of a graphical user interface displaying status and management data associated with a transmit unit in accordance with the present invention.

FIG. 10 is a screen shot of a graphical user interface displaying status and management data associated with a transmit unit in accordance with the present invention. Graphical FIG. 10 includes a screen shot 1000 of a graphical user interface displaying various information associated with a local transmit unit. Screen shot 1000 can display information for a local or a remote transport unit. Screen shot 1000 includes transport unit status 1002, user interface 1004, control menu 1008 and alarm summary 1006.

Transport unit status 1002 includes status information associated with the transport unit. In one embodiment of the present invention, to aid readability, status 1002 is graphically similar to the actual face of a transport unit. User interface 1004 allows a user to perform various actions on either a local or a remote transport unit. Control menu 1008 includes a number of views associated with the transport unit, and alarm summary 1006 provides a quick summary of the alarms pending for a transport unit.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   generating a remote management command at a first network device, wherein said remote management command is configured to manage a second network device, and said first and second network device are coupled to one another by a frame based network;
   receiving, by said first network device, data having a destination on a remote network coupled to the second network device, said data received from a local network coupled to the first network device;
   generating a first and a second universal transport frame by said first network device, wherein said first and second universal transport frames comprise said data having said destination on said remote network, and said remote management command is selectively included in a selected one of the first and second universal transport frames and space for the remote management command is only provided in the selected universal transport frame;
   transmitting said first and second universal transport frames over said frame based network from said first network device to said second network device, and responding to an interrupt signal, if a received remote management command is received at said first network device.

2. The method of claim 1 wherein said remote management command is an instruction to be executed by a processor of said second network device.

3. The method of claim 2, further comprising:
   generating a remote management payload data unit by said first network device, said remote management payload data unit comprising said remote management command, wherein said selected universal transport frame further comprises said remote management payload data unit, and one or more data payload data units comprising said data having said destination on said remote network, and said data payload data units encapsulate packetized data from said data.

4. The method of claim 3 further comprising:
   providing said remote management payload data unit to a remote management interface queue, wherein said remote management interface queue is a queue reserved for temporarily storing one or more remote management payload data units each comprising a remote management command.

5. The method of claim 4 further comprising:
   provisioning said one or more remote management payload data units provided to said remote management interface queue.

6. The method of claim 4, further comprising:
   Selecting, by said first network device, a payload data unit to transmit over said frame based network from a plurality of payload data units stored in a plurality of queues, wherein said plurality of queues includes said remote management interface queue, and said plurality of payload data units includes said one or more data payload data units and said one or more remote management payload data units.

7. The method of claim 6 further comprising:
   selecting a remote management payload data unit from said remote management interface queue before all other queues except a time division multiplex queue.

8. The method of claim 1 further comprising:
   receiving, by said second network device, said selected universal transport frame including said remote management command from said frame based network;
   extracting, by said second network device, said remote management command; and
   executing, by said second network device, said remote management command.

9. The method of claim 1 further comprising:
   translating, by said first network device, one or more of said universal transport frames into a frame for transmission over said frame based network.

10. The method of claim 1 wherein the first and second network devices are the same type of network device.

11. A network device comprising:
    a network device controller;
    a transmit unit coupled to said network device controller, wherein said transmit unit comprising a remote management interface queue configured to store one or more management commands, and one or more input queues configured to store network data, and said transmit unit is configured to form a first and a second outgoing frame, wherein said first and second outgoing frames comprise said network data, and said one or more of said management commands are selectively included in a selected one of the first and second outgoing frames and space for the management commands is only provided in the selected outgoing frame; and a transmit unit controller coupled to said remote management interface queue and said network device controller, wherein said transmit unit controller is configured to generate an interrupt signal to said network device controller when a management command is received from a network.

12. The network device of claim 11, wherein said remote management interface queue is configured to store a plurality of payload data units, each payload data unit comprising a management command.

13. The network device of claim 11, wherein said remote management interface comprises:

a serial data link coupling said transmit unit controller to said network device controller, said serial data link configured to provide said management commands from said network device controller to said remote management interface queue.

14. The network device of claim 11 further comprising:

a scheduler coupled to said remote management interface queue, said scheduler coupled to a plurality of input queues and to a plurality of output queues.

15. The network device of claim 14 wherein a priority of said remote management interface queue is higher than a priority of all input queues except time division multiplex input queues.

16. The network device of claim 11 wherein said transmit unit controller is configured to generate a payload data unit from said management command.

17. The network device of claim 11 further comprising:

an access device coupled to said network device controller, said access device configured to provide a management command to said network device controller.

18. A method comprising:

receiving at a first network device, a frame data unit comprising data having a destination on a locally coupled network and selectively comprising a management command and space for the management command;

extracting said management command from said frame data unit, if said frame data unit comprises said management command;

generating an interrupt to a network device controller, if said frame data unit comprises said management command;

providing said management command to said network device controller via a remote management interface, if said frame data unit comprises said management command; and executing said management command, if said frame data unit comprises said management command.

19. The method of claim 18, wherein said extracting comprises:

extracting said management command from a universal transport frame, wherein said universal transport frame comprises said management command, and said data having said destination on said locally coupled network.

20. The method of claim 18, further comprising:

Generating, by a second network device, said management command for management of said first network device, said second network device is coupled to a network;

generating a universal transport frame by said second network device, said universal transport frame selectively comprising said management command; and transmitting said universal transport frame over a frame based network from said second network device to said first network device.

21. The method of claim 20 further comprising:

generating a payload data unit by said second network device, said payload data unit comprising said management command; and providing said payload data unit to a remote management interface queue of said second network device, wherein said remote management interface queue is a queue reserved for temporarily storing a plurality of payload data units comprising a remote management command.

* * * * *